Dec. 11, 1945.    R. MITCHELL    2,390,726
THREADED FASTENER
Filed Oct. 20, 1942
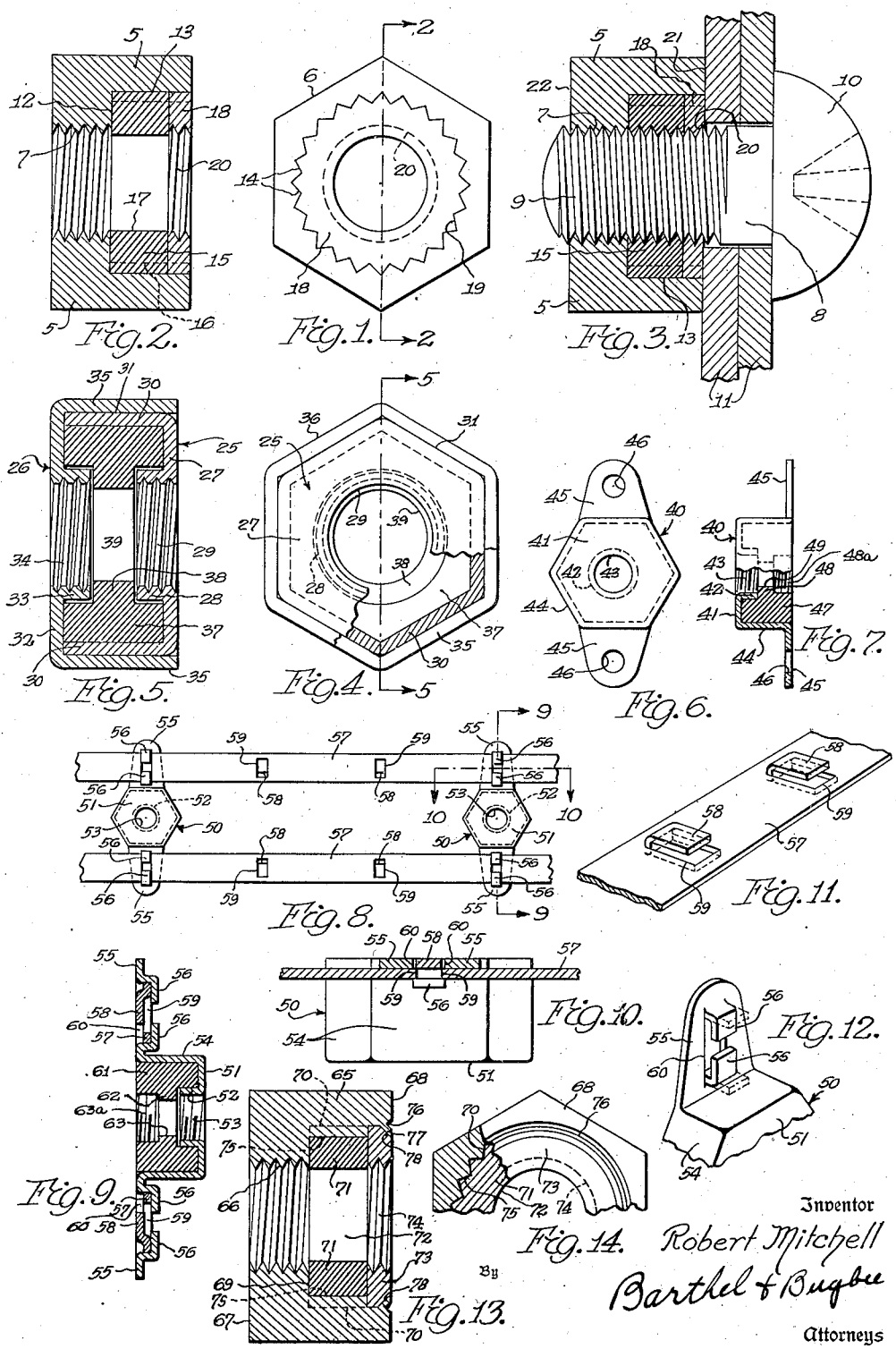
Inventor
Robert Mitchell
By Barthel & Bugbee
Attorneys Patented Dec. 11, 1945

2,390,726

UNITED STATES PATENT OFFICE 2,390,726

THREADED FASTENER

Robert Mitchell, Detroit, Mich.

Application October 20, 1942, Serial No. 462,685

12 Claims. (Cl. 151—7)

The present invention relates to improvements in threaded fasteners and more particularly in self-locking nuts.

The primary object of the invention is to provide a threaded fastener adapted to be used in aircraft body work where considerable vibration is encountered so that vibration will not loosen the nut on the member to which it is threaded.

Another object of the invention is to provide a threaded fastener or nut having a resilient fiber element positioned in the nut so that the nut will be self-locking in any location on the threaded member whereby undue vibration will not cause separation of the threaded fastener elements.

Another object of the invention is to provide a threaded fastener such as a nut with a fiber insert so arranged and positioned within the nut as to exclude grease, oil, water and other elements which would have a detrimental effect upon the fiber structure.

Another object of the invention is to provide a threaded fastener such as a nut or the like with a fiber insert to prevent vibration and dampen transmission of shocks to the nut and said fiber insert is formed with a central opening the diameter of which is smaller than the diameter of the thread opening of the nut so that a bolt when fitted to the nut will impress the threads in the fiber insert to securely anchor the coupled nut and bolt in a locked position.

Another object of the invention is to provide a threaded fastening element as set forth in the above objects which is capable of being attached to a pair of spaced longitudinal strips formed of a flexible material so that a series of nuts or fastening elements may be secured thereto to maintain the nuts in equidistant spaced relation whereby the threaded fastening elements may be secured in position and the strips flexed to any desired position coinciding to the position and arrangement of the bolts and their locations.

Other objects and advantages of the invention will become apparent during the course of the following description of the accompanying drawing wherein:

Figure 1 is a bottom plan view of a preferred embodiment of the invention illustrating the manner in which the fiber inserts are retained in position;

Figure 2 is a transverse cross-sectional view taken on line 2—2 of Figure 1 looking in the direction of the arrows illustrating in detail the location of the fiber insert and the method of retaining the same in position;

Figure 3 is a transverse cross sectional view similar to Figure 2 showing the threaded fastener or nut as being applied to a bolt for clampingly securing a pair of work pieces together;

Figure 4 is a bottom plan view of a modified form of the invention showing a two part nut construction enclosing a fiber insert;

Figure 5 is a horizontal cross sectional view taken on line 5—5 of Figure 4 looking in the direction of the arrows illustrating in detail the manner in which the fiber insert is completely housed within the two-part nut;

Figure 6 is a top plan view of a still further modified form of the invention illustrating a threaded fastener such as a nut formed from a single stamping having anchoring wings for attachment to a support;

Figure 7 is a side elevational view of the form of the invention shown in Figure 6 illustrating a portion thereof broken away for showing the manner in which the fiber insert is retained in position;

Figure 8 is a top plan view of a still further modified form of the invention showing spacing for supporting the threaded fasteners in various positions to facilitate their attachment to bolts in extremely difficult locations;

Figure 9 is a transverse cross sectional view taken on line 9—9 of Figure 8 looking in the direction of the arrows illustrating in detail the manner in which the threaded fasteners are anchored to the supporting strips to prevent sliding movement thereof;

Figure 10 is a longitudinal cross sectional view taken on line 10—10 of Figure 8 looking in the direction of the arrows further showing in detail the manner of locking the threaded members to the supporting strips;

Figure 11 is a perspective view of one of the supporting strips shown in Figure 8 illustrating the manner in which the struck-up lugs are formed therein for interlockingly engaging the wings on the nuts;

Figure 12 is a perspective view of one of the threaded fasteners shown in the form of the invention in Figure 8 illustrating the clamping arms thereon;

Figure 13 is a diametrical cross sectional view of a still further modified form of the invention illustrating a different fiber insert retaining means; and, Figure 14 is a fragmentary bottom plan view of the form of the invention shown in Figure 13 showing the manner in which the threaded fastener is upset to lock the fiber retainer in place.

In the drawing, wherein for the purpose of illustrating the invention and wherein like reference characters will be employed to designate like parts throughout the same, attention is first directed to Figures 1 to 3 inclusive wherein is shown a preferred embodiment of the invention and wherein the reference character 5 will generally be employed to designate a nut having wrench engaging faces 6 providing a body portion of polygonal shape. The body portion is formed with a central opening of reduced diameter which is threaded as at 7 for being received upon a bolt 8 as shown in Figure 3. The bolt 8 is correspondingly threaded as at 9 and is provided with a head 10 so that when the nut 5 is threaded thereon the work pieces or sheets 11 may be clampingly held together.

The threaded portion 7 terminates between the front and rear walls of the body portion as at 12 and the body portion is provided with a bore 13 coextensive with the threaded bore 7 as is clearly shown in Figure 2. The enlarged bore 13 extends to the opposite wall of the body portion 5 and is internally serrated as at 14 to provide a series of spaced ridges or teeth as shown in Figure 1.

Mounted within the enlarged bore 13 is a fiber or other resilient element 15 having its peripheral edge serrated as at 16 so as to inter-engage the teeth 14 of the body portion 5. The fiber insert 15 may be formed from suitable material such as rubber, plastics or various forms of phenol condensation products, and said insert is provided with a central opening 17 in axial alignment with the threaded bore 7 of the body portion 5. The diameter of the axial opening 17 is less than the diameter of the thread base 7 so that when the body portion 5 is threaded on the bolt 8 the threads 9 will impress the insert and form threads therein.

It is to be noted that the fiber insert 15 is slightly less in thickness than the depth of the enlarged bore 13 so that a retaining element 18 may be placed in position on the underside of the nut 5 and thereby confine the fiber insert 15. The retaining member 18 is likewise provided with a serrated peripheral wall 19 for being received within the serrated portion 14 of the enlarged bore 13. This construction facilitates the alignment of the threads in the threaded opening 20 with the threads in the threaded opening 7 of the body portion so that the threads of the bolt 9 will feed therethrough without being distorted.

It is intended to form the retaining element 18 of a size so that it will have a press fit within the enlarged bore 13 to thereby retain the fiber element 15 within said bore. When the nut 5 is threaded on the bolt 9 the inner wall 21 thereof engages the work sheets 11 while the outer wall 22 is exposed as is clearly shown in Figure 3. This construction and arrangement insures against the entrance of foreign matter such as oil and grease to the fiber insert which will not become disintegrated or lose its resiliency.

Attention is now directed to the form of the invention shown in Figures 4 and 5 wherein the nut or threaded fastener is shown as being formed by a pair of telescoped sections 25 and 26 each of which is preferably stamped from sheet metal or the like to reduce the cost of production. The inner section 25 is formed with a base portion 27 having a central annular flange 28 which is screw-threaded internally as at 29. The base portion 27 is formed with a polygonal wall 30 providing conforming wall facets 31. It is noted that the polygonal wall portion 30 extends a considerable distance beyond the threaded annular flange 28 as is clearly illustrated in Figure 5. The other section 26 is similarly formed and is provided with a front wall 32 having a central annular flange 33 which is in axial alignment with the annular flange 28 and is likewise threaded as at 34. The front wall 32 is provided with a marginal upstanding wall 35 of polygonal shape providing a series of wrench-engaging facets 36. It is noted that the walls 30 and 35 are of such dimensions as to facilitate the sliding of one upon the other so that they may be telescoped together and frictionally held in place. The facets 31 and 36 are adapted to be so positioned as to continuously align the threads 29 and 34 so that when the fastening element is threaded upon a bolt the threads will not be distorted.

Sandwiched between the telescoped sections 25 and 26 is a fiber insert 37 having a central annular enlarged portion 38 forming a central opening 39. The fiber insert 37 is so positioned as to be clamped by the base 27 and front wall 32 and to allow the annular portion 38 to project inwardly between the annular flanges 28 and 33. The central opening 39 is of a smaller diameter than the base diameter of the threaded portions 29 and 34 so that when the fastening element is threaded on a bolt the threads of the bolt will be impressed in the opening 39 and said fiber insert 37 will cause the threaded fastener to be self-locking in any position upon the bolt by reason of the frictional engagement of the fiber insert with said bolt. When the threaded fastener shown in Figures 4 and 5 is coupled with a bolt the base 27 is presented to the bolt first so that the threaded portion 29 will be received thereon in advance of the threaded portion 34.

In the form of the invention shown in Figures 6 and 7, the threaded fastener generally indicated by the reference character 40 is formed from a single stamping and includes a top wall portion 41 having an inwardly directed annular flange portion 42 which is threaded as at 43 for engaging the bolt or other threaded element to which the nut is coupled. Depending from the top wall 41 is a side wall 44 of polygonal shape providing a casing-like structure of hollow formation. Formed integral with opposed portions of the polygonal wall 44 is a pair of oppositely extending winglike projections 45 having apertures 46 for receiving rivets or other fastening elements adapted to fasten or anchor the casing-like structure to the material or sheets being bolted together. Inserted within the casing-like structure is a fiber insert 47 which is likewise formed of polygonal shape so as to be prevented from rotating when a bolt is threaded in place. The insert 47 is formed with an annular flange 48 extending inwardly beneath the annular flange 42 and said annular flange 48 is provided with an aperture 49 in axial alignment with the threaded portion 43 of the annular flange 42. The aperture 49 is formed of a diameter smaller than the internal diameter of the annular flange 42 so that when a bolt is threaded in place, the threads of the bolt will impress screw threads in the fiber insert 47 and thereby retain the bolt frictionally in position.

In the modified form of the invention shown in Figures 8 to 12 inclusive, the fastening element generally indicated by the reference character 50 is formed similar to the fastening element shown in Figures 6 and 7 and includes a top wall portion 51 having a central annular flange 52 which is internally screw threaded as at 53. A polygonal side wall 54 extends inwardly from the front wall 51 and formed integral with opposed portions of the polygonal side wall 54 is a pair of oppositely extending wings 55 having struck-up lugs 56 which are normally in the dotted line position shown in Figure 12 so that they may be readily bent over a pair of supporting strips 57 as shown in Figure 8. Each of the supporting strips 57 is identical in formation and is provided with struck-up lugs 58 formed by producing openings 59 and bending the metal therefrom by displacement as shown in Figure 11. In assembling the threaded fastening elements 50 upon the supporting strips 57 the lugs 58 are arranged so as to be received in the opening 60 of each of the wings 55 as is clearly shown in Figure 9. The lugs 56 are then bent over the edges of the strip 57 to securely hold the threaded fastening elements in predetermined locked positions.

A fiber insert 61 is adapted to be received in the casing-like fastening element 50 and said fiber insert is provided with an annular flange 62 extending beneath the annular inwardly directed flange 52 so that an opening 63 in the insert will be in alignment with the threaded portion 53. The diameter of the opening 63 is slightly less than the overall diameter of the threaded portion 53 so that when a bolt is coupled with the fastening element 50 the threads thereof will be impressed in the fiber insert and thereby lock the bolt in frictional coupled relation with the threaded fastener.

The supporting strips 57 are preferably formed of a flexible material capable of being preformed or bent to various positions and shapes to locate the threaded fasteners 50 at desired bolt positions. The strips 57 may be formed circular so as to facilitate the bolting of cowling or the like in aircraft construction or the strips may be bent transversely of their length to encircle cylindrical objects where difficulty is encountered in gaining access to the bolt by reason of the space limitations.

In the form of the invention shown in Figures 13 and 14, the body portion of the threaded fastener 65 is formed of a central internally threaded opening 66 and is provided with a front wall 67 and a rear wall 68. The central threaded opening 66 terminates intermediate the front and rear walls 67 and 68 respectively as at 69 and continues toward the front wall 68 in an enlarged serrated bore 70 forming a series of longitudinal teeth or rib portions. A fiber insert 71 is received in the enlarged serrated bore 70 and is provided with an opening 72 of slightly less diameter than the threaded bore 66 and is likewise in axial alignment therewith. The fiber insert 72 is of reduced width to facilitate the insertion of a retaining ring 73 which is internally screw-threaded as at 74, the threads of which are continuous in registry with the threads 66. The retaining ring 73 has its external periphery serrated corresponding to that of said bore 70, thereby preventing rotation of the ring relative to the body portion 65.

In order to retain the ring 73 in position the rear wall 68 is punched by a circular punch or the like at a point indicated at 76 so as to displace the metal 77 over the beveled edge 78 of the ring. This upsetting operation may be carried out in any number of ways and, if desired, the metal may be displaced by punching the face 68 adjacent the enlarged bore 70 so as to displace metal over the beveled surface 78 at circumferentially spaced points instead of using a circular shaped punch or instrument.

It is to be understood that the forms of the invention herewith shown and described are to be taken as preferred embodiments thereof and that various changes in the shape, size and arrangement of parts may be resorted to without departing from the spirit of the invention or the scope of the subjoined claims.

What I claim is:

1. A threaded fastener, comprising a body portion having a threaded bore extending inwardly from one side thereof, said bore terminating in an enlarged bore extending to the opposite side of the body portion, a series of serrations formed on the wall of the enlarged bore, a fibre insert having serrations meshing with the serrations on the wall of the bore and a disk received in said bore to anchor the insert in position, said insert having an unthreaded opening of a smaller diameter than the diameter of said bore and said disk being provided with a threaded opening of the same diameter as the threaded bore in the body member.

2. A threaded fastener, comprising a body portion having a threaded bore extending inwardly from the front wall thereof, said body portion having an alined enlarged bore extending inwardly from the opposite wall, serrations formed on the internal wall of the enlarged bore, a fibre insert located in the enlarged bore having a serrated edge meshing with the serrations in the wall of the enlarged bore and a retaining disk having a threaded aperture received in said enlarged bore for clampingly engaging the fibre insert.

3. A threaded fastener, comprising a body portion having a threaded opening extending inwardly from the front wall thereof and an enlarged bore extending inwardly from the opposite side thereof, said enlarged bore having a series of undulations in its wall, a fibre insert having its edge serrated for being received in the wall of the bore, a retaining disk having a serrated edge and a central threaded aperture adapted to be received in the enlarged bore so that the serrated edge will engage the undulations in the bore and a struck-in portion formed on the body portion to displace the material adjacent the retaining disk and anchor the disk in place.

4. A threaded fastener, comprising a pair of telescoped sections having alined threaded apertures, a fibre insert located between the sections and means for preventing rotation of the insert relative to the telescoped sections.

5. A threaded fastener, comprising a pair of hollow telescoped sections of polygonal formation having inwardly divided threaded annular flanges, a fibre insert located between said hollow sections and said insert having an aperture of a diameter less than the diameter of threaded annular flanges whereby the threads of a male fastener will be frictionally gripped by said insert.

6. A threaded fastener, comprising a pair of telescoped sections having internal cavities and threaded inwardly extending annular flanges, a flexible insert positioned between the sections having an annular flange extending inwardly between the threaded annular flanges and said telescoped sections being frictionally retained in assembled relation one with the other.

7. A threaded fastener assembly, comprising a stamping having a cavity and an inwardly extending threaded annular flange on its front wall, a pair of oppositely extending wing portions formed on the stamping, anchoring lugs struck up from said wings, a pair of separable supporting strips arranged in spaced apart parallel relation adapted to be received between said lugs so that the lugs may be bent thereover, and a flexible resilient insert located in said cavity having an aperture in alinement with the threaded annular flange.

8. A threaded fastener assembly, comprising a stamping having a cavity and an annular threaded inwardly directed flange, a pair of wing extensions formed on the stamping adjacent said cavity, a pair of separable supporting strips detachably connecting said wing extensions, interlocking means carried by the strips and wings to secure the stamping in a predetermined position and an apertured flexible insert in said cavity.

9. A threaded fastener, comprising a pair of nut members having threaded apertures, said nut members being assembled so that the threaded apertures will be arranged in axial spaced apart alignment, a bolt engaging and gripping portion between said threaded apertures having an unthreaded opening in registry and alignment with and of a slightly smaller diameter than said threaded apertures, and means for retaining said nut members in assembled relation.

10. A threaded fastener, comprising a pair of nut members having threaded apertures, said nut members being assembled so that the threaded apertures will be arranged in axial spaced apart alignment, a bolt engaging and gripping portion between said threaded apertures having an unthreaded opening in registry and alignment with and of a slightly smaller diameter than said threaded apertures, and means for retaining said nut members in assembled relation, said nut members being slidably fitted together one within the other.

11. A threaded fastener, comprising a pair of nut members having threaded apertures, said nut members being assembled so that the threaded apertures will be arranged in axial spaced apart alignment, a bolt engaging and gripping portion between said threaded apertures having an unthreaded opening in registry and alignment with and of a slightly smaller diameter than said threaded apertures, and means for retaining said nut members in assembled relation, said bolt engaging and gripping portion being formed of an elastic resilient material.

12. A threaded fastener, comprising a body portion having a threaded aperture extending inwardly from the top wall thereof and an axially aligned cavity extending inwardly from the bottom wall thereof, a flexible fibre insert adapted to be received in said cavity through the bottom wall of said body portion, said insert having formed therein a screw receiving opening of a diameter smaller than the diameter of the threaded aperture, said cavity having a series of angularly arranged facets to engage correspondingly shaped facets on said insert for preventing rotation of said insert while being threaded on a threaded male member, and said cavity being reduced and screw threaded to provide a threaded opening disposed in alignment with and of the same dimensions as the first-mentioned threaded aperture on the other side of said screw receiving opening.

ROBERT MITCHELL.